(12) United States Patent
Rathay et al.

(10) Patent No.: US 11,415,080 B2
(45) Date of Patent: Aug. 16, 2022

(54) ENGINE FOR AN AIRCRAFT

(71) Applicant: General Electric Company, Schenectady, NY (US)

(72) Inventors: Nicholas William Rathay, Rock City Falls, NY (US); Timothy John Sommerer, Ballston Spa, NY (US); Narendra Digamber Joshi, Schenectady, NY (US); Venkat Eswarlu Tangirala, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 298 days.

(21) Appl. No.: 15/979,217

(22) Filed: May 14, 2018

(65) Prior Publication Data

US 2019/0345895 A1 Nov. 14, 2019

(51) Int. Cl.
  *F02K 7/10* (2006.01)
  *F02K 7/14* (2006.01)
  *F23R 3/12* (2006.01)

(52) U.S. Cl.
  CPC .............. *F02K 7/10* (2013.01); *F02K 7/14* (2013.01); *F23R 3/12* (2013.01); *F23R 2900/00009* (2013.01); *F23R 2900/00015* (2013.01)

(58) Field of Classification Search
  CPC ...... F02K 7/10; F02K 7/14; F23R 3/12; F23R 2900/00015; F23R 2900/00009
  See application file for complete search history.

(56) References Cited

U.S. PATENT DOCUMENTS

| | | | | |
|---|---|---|---|---|
| 3,041,824 A | * | 7/1962 | Berhman | F02K 7/10 60/203.1 |
| 3,667,233 A | * | 6/1972 | Curran | F02K 7/14 60/768 |
| 4,821,512 A | * | 4/1989 | Guile | F02K 7/10 60/768 |
| 8,863,495 B2 | * | 10/2014 | Ikeda | F02C 7/264 60/39.821 |
| 2005/0081508 A1 | * | 4/2005 | Edelman | F02K 7/16 60/767 |

(Continued)

FOREIGN PATENT DOCUMENTS

| | | | |
|---|---|---|---|
| JP | 2016186409 A | * | 10/2016 |
| JP | 2017160873 A | * | 9/2017 |

OTHER PUBLICATIONS

Micka et al "Combustion characteristics of a dual-mode scramjet combustor with cavity flameholder" Proceedings of the Combustion Institute 32 (2009) pp. 2397-2404 (Year: 2009).*

(Continued)

*Primary Examiner* — Ted Kim
(74) *Attorney, Agent, or Firm* — Venable LLP; Peter T. Hrubiec; Michele V. Frank

(57) ABSTRACT

An engine includes an inlet tube introducing air to a combustion process and a first plurality of fuel injectors disposed in the inlet tube and used for scram-jet engine operation. The engine includes a second plurality of fuel injectors used for ram-jet engine operation. The second plurality of fuel injectors is upstream from the first plurality of fuel injectors and is disposed in the inlet tube. The engine includes a combustor swirl zone downstream of and adjacent to the first plurality of fuel injectors.

9 Claims, 5 Drawing Sheets

(56) References Cited

U.S. PATENT DOCUMENTS

| | | | | |
|---|---|---|---|---|
| 2007/0044449 | A1* | 3/2007 | O'Brien | F02K 7/10 60/39.826 |
| 2008/0196414 | A1* | 8/2008 | Andreadis | F02K 7/10 60/746 |
| 2009/0165436 | A1* | 7/2009 | Herbon | F23R 3/286 60/39.826 |
| 2015/0275762 | A1* | 10/2015 | Kenyon | F02C 6/00 60/39.17 |
| 2016/0363318 | A1* | 12/2016 | Ueno | F02K 7/18 |
| 2020/0362795 | A1* | 11/2020 | Nakamura | F02K 7/14 |

OTHER PUBLICATIONS

Wagner et al "Plasma Torch Igniter for Scramjets" J. Propulsion vol. 5, No. 5, Sep.-Oct. 1989, pp. 548-554 (Year: 1989).*

Macheret et al "Energy Efficiency of Plasma-Assisted Combustion in Ram/Scramjet Engines" 36th AIAA Plasmadynamics and Lasers Conference Jun. 6-9, 2005, Toronto, Ontario Canada, AIAA 2005-5371, pp. 1-8 (Year: 2005).*

Kim et al "Plasma Assisted Flame Holding in Subsonic and Supersonic Flows" 48th AIAA Aerospace Sciences Meeting Including the New Horizons Forum and Aerospace Exposition, Jan. 4-7, 2010, Orlando, Florida, AIAA 2010-263, pp. 1-17 (Year: 2010).*

Li et al "Plasma-assisted ignition for a kerosene fueled scramjet at Mach 1.8", Aerospace Science and Technology, vol. 28, Issue 1, 2013, pp. 72-78 (Year: 2013).*

Freeborn "Swept-Leading-Edge Pylon Effects on a Scramjet Pylon-Cavity Flameholder Flowfield" Journal of Propulsion and Power; vol. 25, No. 3, May-Jun. 2009, pp. 571-582. (Year: 2009).*

S.Singh, V.B.Neculaes, V.Lissiansk, G.Rizeq, S.B.Bulumulla, R.Subia, J.Manke, "Microwave assisted coal conversion", https://www.sciencedirect.com/science/article/pii/S0016236114009776.

Mike Rycroft, "Plasma gasification of waste: arcs and microwaves offer advantages", Oct. 13, 2016, Published in Articles: EE Publishers, Articles: Energize, http://www.ee.co.za/article/plasma-gasification-waste-arcs-microwaves-offer-advantages.html.

"R.F. Induction Plasma Spraying", https://www.researchgate.net/publication/279382734_RF_Induction_Plasma_Spraying.

* cited by examiner

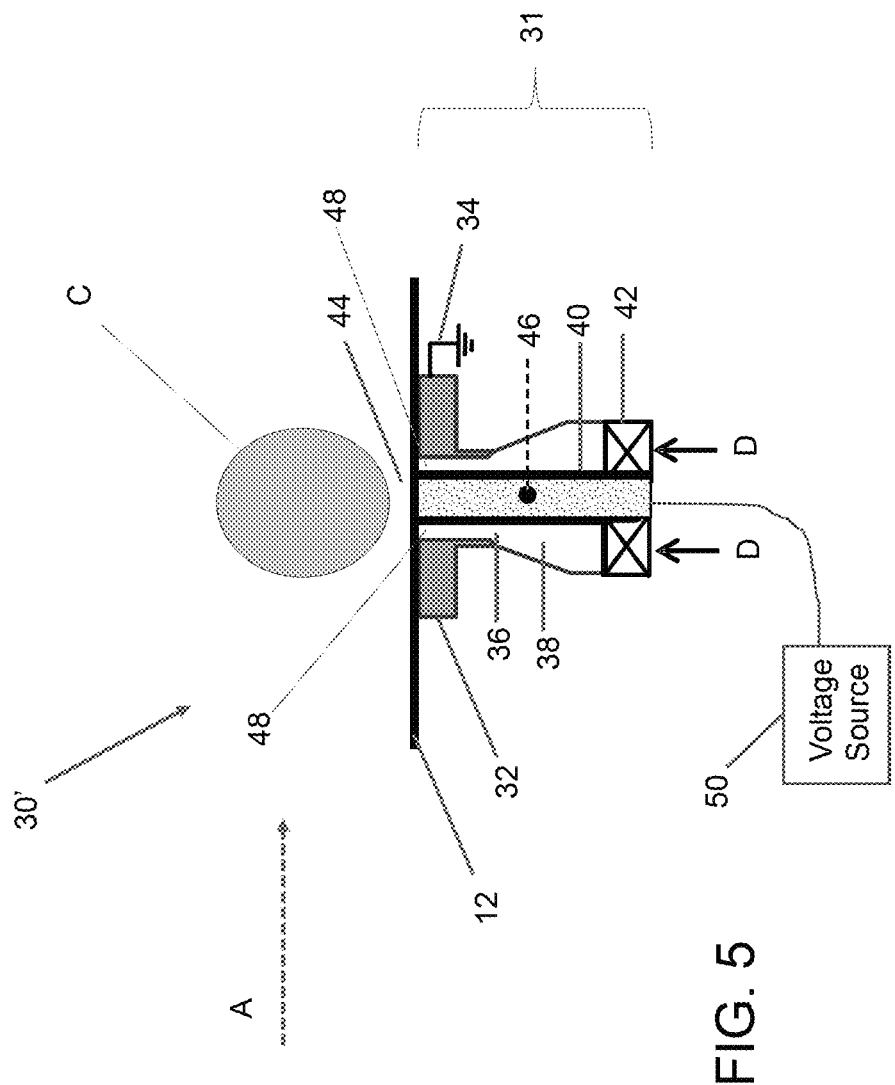

ENGINE FOR AN AIRCRAFT

BACKGROUND

The subject matter disclosed herein relates to an aircraft engine.

Dual-mode ramjet (DMRJ) engines can typically only operate above flight Mach numbers of 3-4, and even in this Mach number range, combustion stability can be a big challenge.

Producing stabilized combustion in dual-mode ramjet and scramjet engines through a wider range of operating conditions, as well as in combined-cycle applications employing gas turbine engines.

BRIEF DESCRIPTION OF THE EMBODIMENTS

Aspects of the present embodiments are summarized below. These embodiments are not intended to limit the scope of the claimed invention, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one embodiment, an engine includes an inlet tube introducing air to a combustion process and a first plurality of fuel injectors disposed in the inlet tube and used for scram-jet engine operation. The engine includes a second plurality of fuel injectors used for ram-jet engine operation. The second plurality of fuel injectors is upstream from the first plurality of fuel injectors and is disposed in the inlet tube. The engine includes a combustor swirl zone downstream of and adjacent to the first plurality of fuel injectors.

In another embodiment an engine includes an air inlet tube, at least one scramjet fuel injector disposed in the air inlet tube, and at least one plasma stabilizer.

In another embodiment, an engine includes an inlet tube introducing air to a combustion process, a first plurality of fuel injectors, a second plurality of fuel injectors disposed in the inlet tube upstream from the first plurality of fuel injectors, a combustor swirl zone downstream of the first plurality of fuel injectors, and at least one plasma stabilizer. The plasma stabilizer includes a high voltage center rod and a converging flow area concentrically surrounding the high voltage center rod. The converging flow area includes an outer diameter. An annular gap is defined between the high voltage center rod and the outer diameter of the converging flow area.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a side view of a plasma stabilizer as illustrated in any of FIGS. 2-4.

Figure 1:
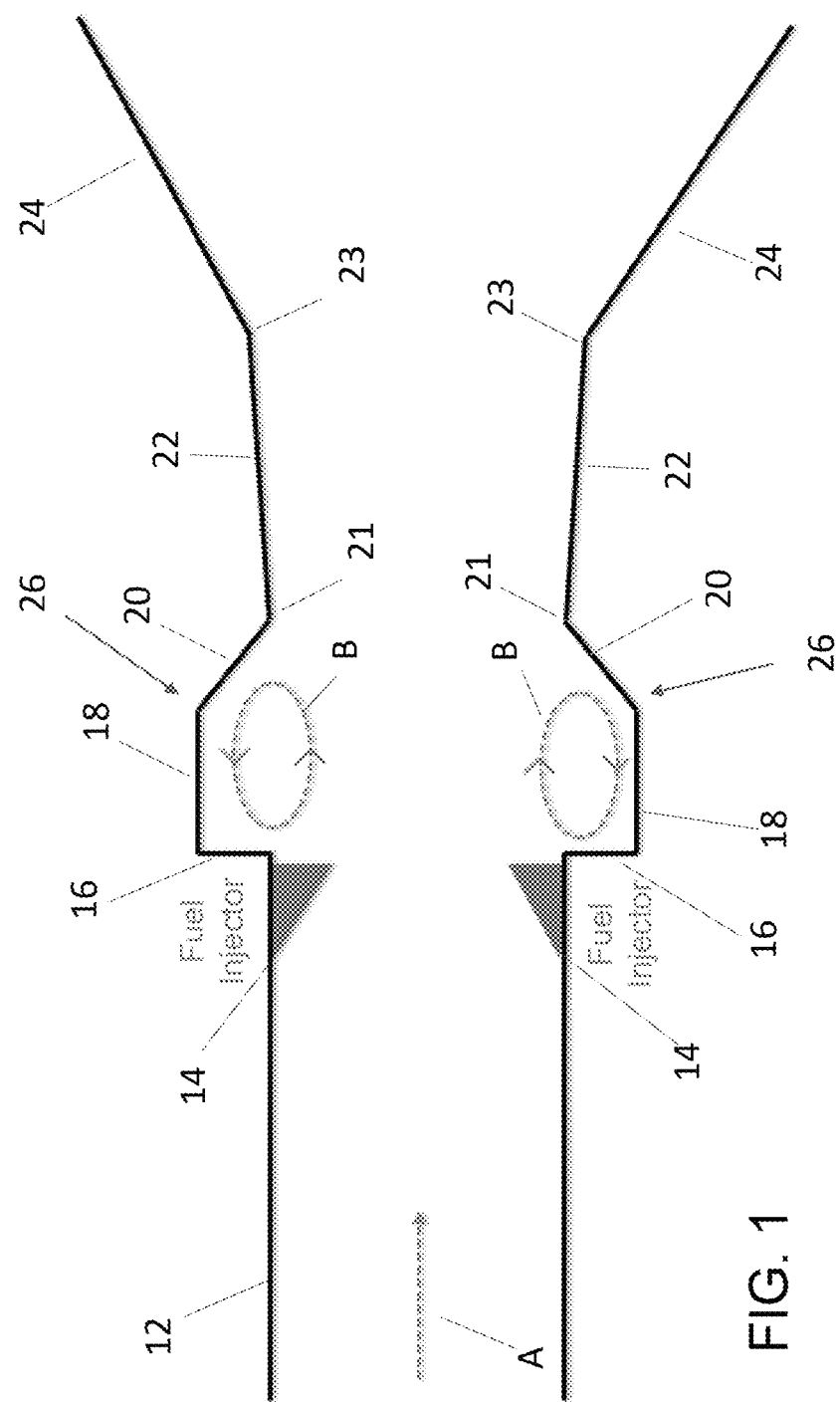
FIG. 1 is a side schematic representation of an exemplary aircraft engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of the gas turbine engine or alternatively the central axis of a propulsion engine. An axially forward end of the gas turbine engine is the end proximate the fan and/or compressor inlet where air enters the gas turbine engine. An axially aft end of the gas turbine engine is the end of the gas turbine proximate the engine exhaust where low pressure combustion gases exit the engine via the low pressure (LP) turbine. In non-turbine engines, axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

As used herein, the term "plasma" refers to a gas that has been made electrically conductive by heating or subjecting it to electromagnetic fields, where long-range electromagnetic fields dominate the behavior of the matter.

As used herein, the term "cold plasma" refers to a plasma in which the characteristic temperature of the electrons is much higher than the characteristic temperature of the 'heavy' particles, namely the neutral and ionized molecules and atoms, rather than being in thermal equilibrium (i.e., a "thermal" plasma).

As used herein, the term "plasma stabilizer" refers to a plasma-generating device to create a plasma that acts to stabilize a combustion process in terms of its location or its temporal behavior, or both. By way of example, a combustion flame can be spatially stabilized through use of swirl vanes or a bluff-body in the gas flow that creates a recirculation zone that stabilizes the location of a flame. An unsteady (time-varying) flame can be temporally stabilized by adjusting or modulating the fuel flow. A plasma can locally enhance combustion, stabilize the flame in a given location, and/or can be modulated to manage unsteady (time-varying) flame properties.

As used herein, the term "ramjet" refers to an airbreathing jet engine that uses the engine's forward motion to compress incoming air without an axial compressor or a centrifugal compressor.

As used herein, the term "scramjet" refers to a variant of a ramjet airbreathing jet engine in which combustion takes place in supersonic airflow therein.

Embodiments of the present disclosure relate to ramjet and scramjet engines, as well as dual-mode ramjet (DMRJ) engines. A dual-mode ramjet (DMRJ) engine is an airbreathing engine that helps to enable reliable hypersonic flight. This engine can typically only operate above flight Mach numbers of 3-4, and even in this Mach number range, combustion stability can be a big challenge. In addition, the limited Mach number range has little overlap with gas turbine engines, which operating at Mach 0 to Mach 3, and struggle to reach Mach numbers 3-4. Thus, it is difficult to bridge the gap between conventional gas turbine and DMRJ engine flight speeds. For the DMRJ engine, low Mach number flight equates to low engine pressure and temperature. Autoignition time of the fuel increases greatly as a result of low Mach number operation, and the combustion flame can be difficult to stabilize. Injected plasma energy can adapt to changes as the vehicle speed changes, and can be modulated to damp undesirable instabilities of the combustion flame.

The embodiments disclosed herein account for the increased autoignition times for liquid fuel during lower temperature operation of the combustor (at relatively low flight Mach numbers during ram operation) by injecting fuel upstream of the scram operation injection location and including plasma stabilizers.

FIG. 1 illustrates fuel injection for a dual-mode scramjet. Engine 10 includes an inlet tube 12, with air flowing through in an axial direction A. Fuel is injected at a first plurality of fuel injectors 14. A combustor swirl zone 26 is axially downstream of the plurality of fuel injectors and includes a backward facing step 16, where the radius of the engine 10 is increased compared to the inlet tube 12. The first plurality of fuel injectors 14 are adjacent the combustor swirl zone 26 and are used in connection with scramjet operation, i.e., supersonic combustion. The each fuel injector of the first plurality of fuel injectors 14 extends radially inward into the interior of the inlet tube 12 for dispensing fuel directly into inlet air flowing in the axial direction A. The inlet tube and other components of the engine 10 may be substantially cylindrical and/or axisymmetric. The combustor swirl zone 26 also includes an axial portion 18 extending downstream from the backward facing step 16 at an approximately constant radius (concentric about an engine centerline). An outer radius of the combustor swirl zone 26 occurs at the axial portion 18 and is larger than an outer radius of the inlet tube 12. The combustor swirl zone 26 accommodates swirl, shown at location B in FIG. 1.

Axially aft of the axial portion 18 is a tapered portion 20 where the radius decreases as the tapered portion 20 extends axially aft. In the view in FIG. 1, the tapered portion 20 appears to angle radially inward. When viewed in three dimensions, the tapered portion 20, (which is rotated 360 degrees around an engine centerline) appears more cone-shaped and intersections with a downstream portion 22 at intersection 21. The downstream portion 22 extends axially aft from the tapered portion 20 at an angle that gradually increases radially outward to a diverging exhaust portion 24 at intersection 23. The diverging exhaust portion 24 extends in an aft direction from the downstream portion 22 and diverges radially outward (while extending axially aft) at a steeper angle than the downstream portion 22.

The arrangement illustrated in FIG. 1 is effective for flame stabilization during scramjet operation (high flight Mach number). However, at lower Mach number, fuel autoignition time increases, and combustion takes place further downstream, or not at all in some conditions.

Figure 2:
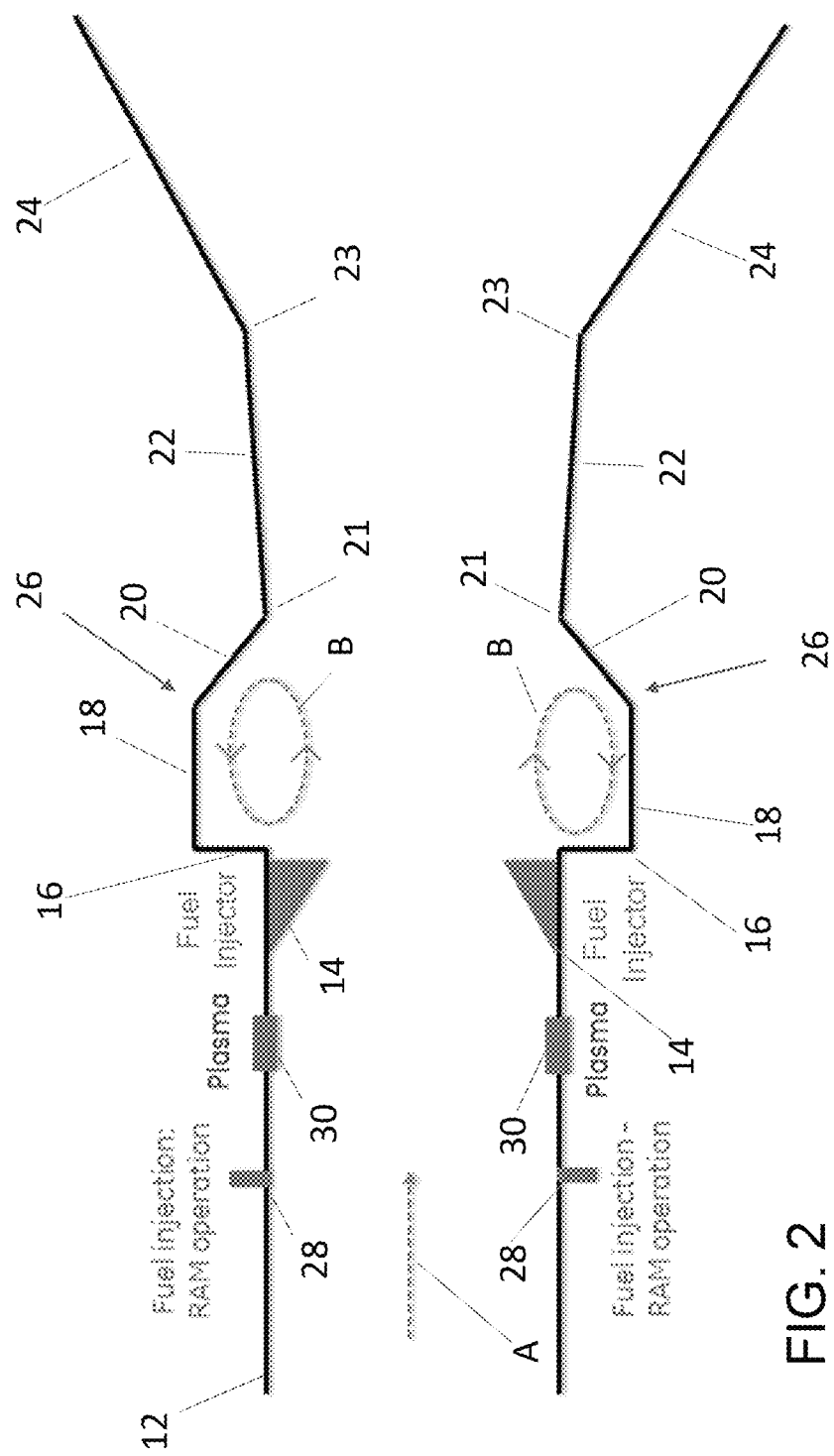
FIG. 2 is a side schematic representation of an exemplary aircraft engine and various engine components.

FIG. 2 illustrates an embodiment with fuel injection upstream of the first plurality of fuel injectors 14, at a second plurality of fuel injectors 28 used as ram injectors 28. Whereas the first plurality of fuel injectors 14 extend radially inward into the interior of the inlet tube 12, each of the second plurality of fuel injectors are disposed at the periphery of the inlet tube 12, closer to an inner diameter of the inlet tube. In addition, plasma stabilizers 30 are included downstream of the ram injectors 28, but upstream of the scram injection locations 14. The system of upstream fuel injection via the ram injectors 28 with plasma stabilizers 30 accommodates the increased autoignition time for liquid fuel during the lower temperature (ram) operator of the combustor and allow stable ram operation at lower Mach numbers, down to the range where turbojet engines are effective. The plasma stabilizers 30 add plasma energy to the interior of the engine during conditions in which the inlet air temperature is lower due to lower ram effects resulting from lower Mach number operation. The plasma energy introduced from the plasma stabilizers 30 serves to keep the fuel and air stream stably ignited during varying operating conditions.

Figure 3:
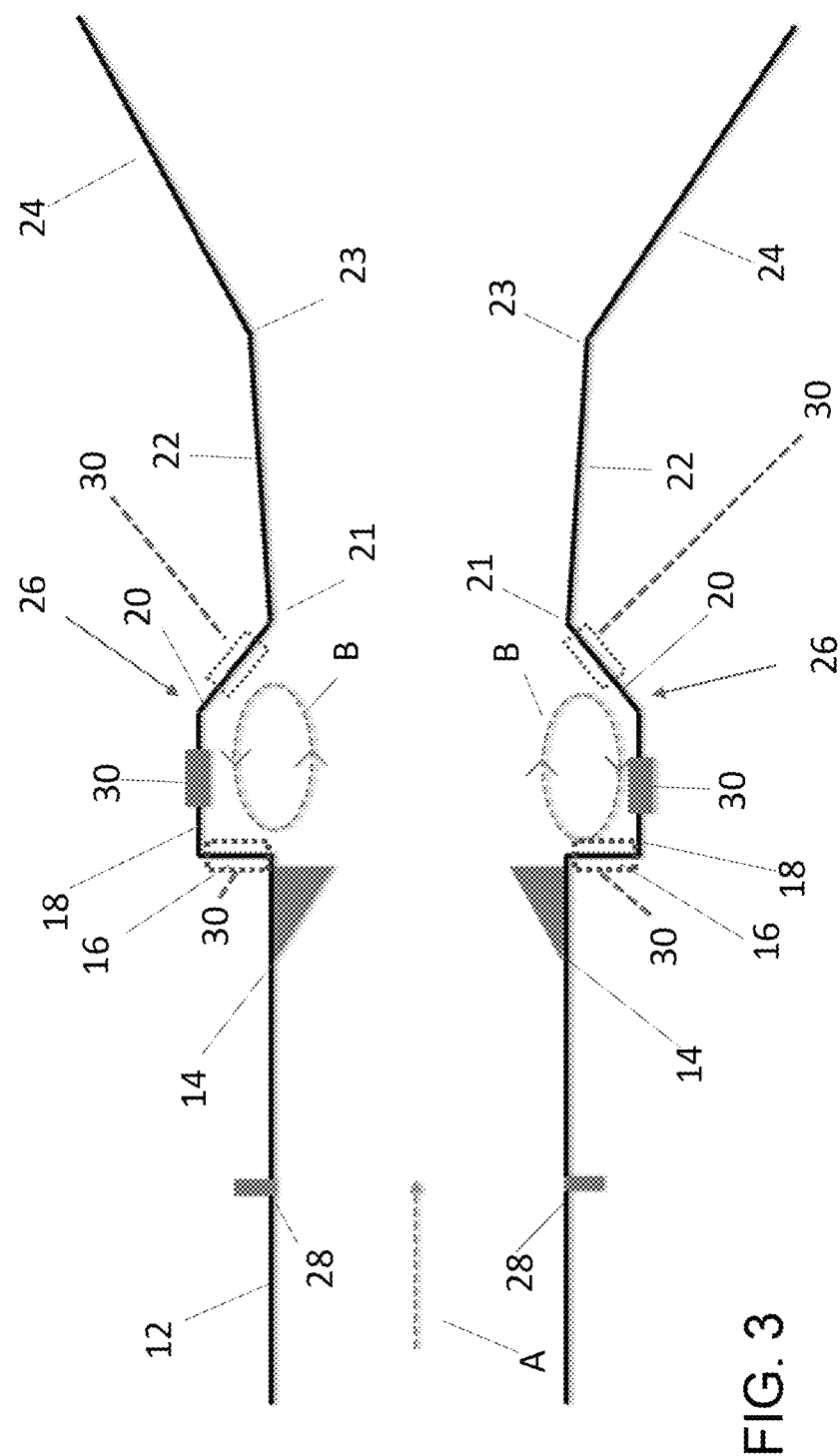
FIG. 3 is a side schematic representation of an exemplary aircraft engine and various engine components.

FIG. 3 illustrates an embodiment with fuel injection upstream of the first plurality of fuel injectors 14, at the second plurality of fuel injectors 28 acting as ram injections. In addition, plasma stabilizers 30 are included downstream of both the second plurality of fuel injectors 28 and the first plurality of fuel injectors 14. As illustrated in FIG. 3, the plasma stabilizers may be located in the axial portion 18 of the combustor swirl zone 26, but they may also be located in the backward facing step 16 or in the tapered portion 20 (illustrated as 30 with dashed lines in FIG. 3). The plasma stabilizers 30 add plasma energy to the interior of the engine during conditions in which the inlet air temperature is lower due to lower ram effects resulting from lower Mach number operation. The plasma energy introduced from the plasma stabilizers 30 serves to keep the fuel and air stream stably ignited during varying operating conditions.

Figure 4:
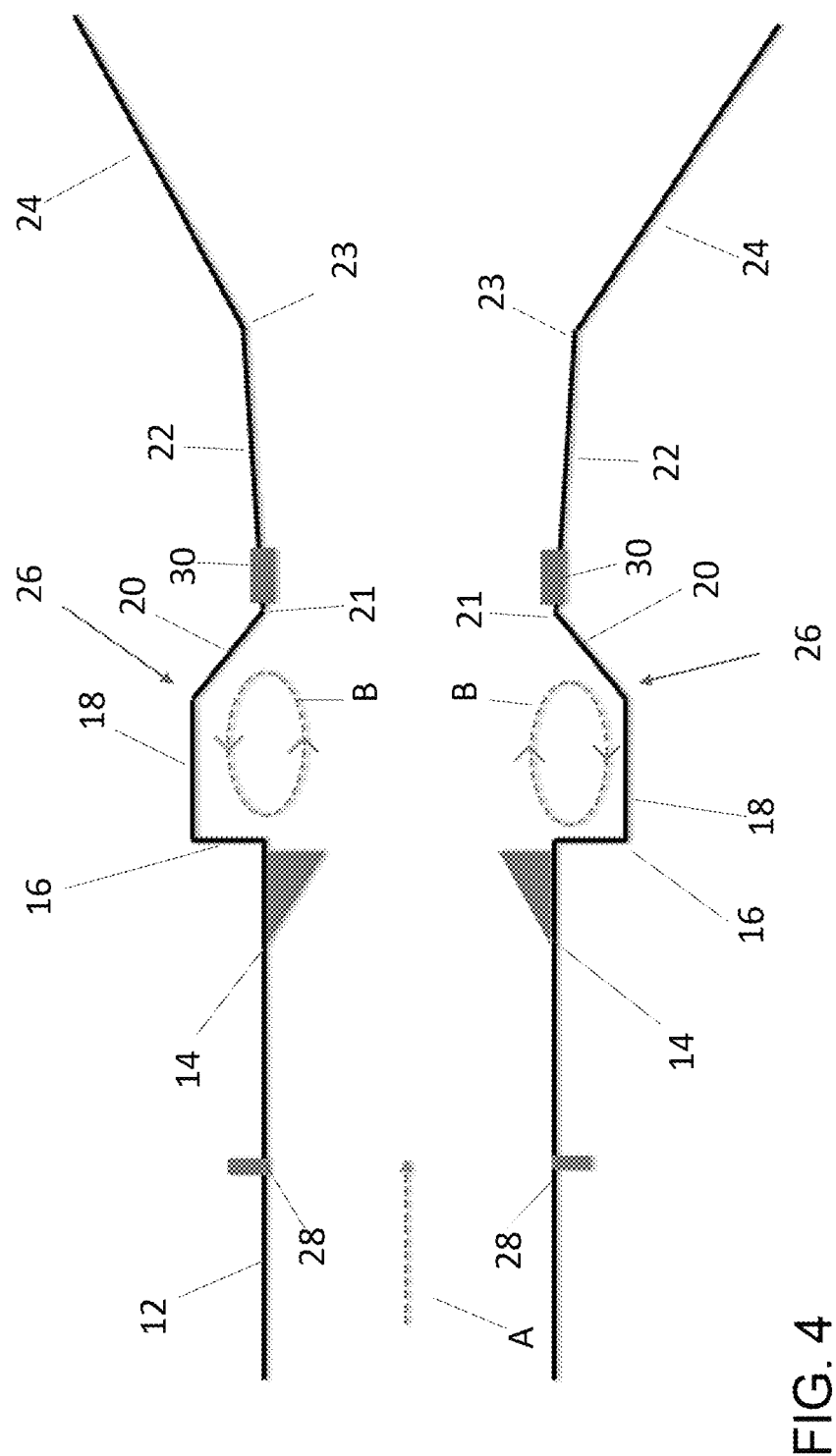
FIG. 4 is a side schematic representation of an exemplary aircraft engine and various engine components.

FIG. 4 illustrates an embodiment with fuel injection upstream of the first plurality of fuel injectors 14, at the second set of fuel injectors 28. In addition, plasma stabilizers 30 are included downstream of both the ram injectors 28 and the scram injection locations 14. In the embodiment shown in FIG. 4, the plasma stabilizers 30 are in the downstream portion 22, adjacent the interface between the downstream portion 22 and the tapered portion 20. The plasma stabilizers 30 add plasma energy to the interior of the engine during conditions in which the inlet air temperature is lower due to lower ram effects resulting from lower Mach number operation. The plasma energy introduced from the plasma stabilizers 30 serves to keep the fuel and air stream stably ignited during varying operating conditions.

Both the fuel injectors at the scram injection location 14 as well as the ram injectors 28 of the present embodiments are capable of rapid modulation of the fuel flow, in the range of a few milliseconds, for example, in a range from about 1 to about 400 milliseconds, from about 2 to about 200 milliseconds, from about 3 to about 100 milliseconds, from about 4 to about 50 milliseconds, from about 5 to about 30 milliseconds, from about 10 to about 25 milliseconds, or from about 15 to about 20 milliseconds.

Several plasma stabilizer arrangements are possible. A 'microwave plasma' can be created by injecting microwave electric power into a gas (such as air or a fuel-air mixture), where the microwave electric power preferentially couples to gaseous regions that are already ionized and conducting, such as the flame front, thereby adding energy to the flame front and increasing the local heat-release rate.

Microwave plasma can also be created upstream of the flame zone, in either the air or the air-fuel mixture, where it can act as a source of plasma that generates reactive radicals that flow into and enhance the combustion process, without necessarily depositing energy into ordinary gas heating. The resulting plasma can either be cold or thermal. Gas can be introduced through the plasma into the combustion region (for example from the sidewall of the combustion chamber), a device that is sometimes referred to as a 'plasmatron.' The microwave frequency may be in a range from about 0.3 GHz to about 300 GHz.

The plasmatron plasma stabilizer can also be powered by other means such as radiofrequency induction (in a range from about 3 kHz to about 0.3 Ghz), or by electrodes driven by direct or alternating current. A hot jet emerges in the combustion chamber to stabilize and control the flame. Radiofrequency or microwave energy can be created by power electronics or a magnetron and conveyed to the desired region in the engine by a transmission line such as a coaxial cable or other suitably shaped structures like waveguides or 'applicators.'

A spark plasma can be created to stabilize flame in a manner similar to a diffusion pilot flame in a combustor, where the overall fuel-air ratio is lean (that is, where oxygen remains after complete combustion of the fuel). In this arrangement the plasma acts as localized heat source. Such a plasma can be created by an intermittent 'spark' plasma (for example, a spark plug igniter), or a continuous 'arc' plasma that is maintained between two electrodes by controlling the current that flows through the circuit. A spark plasma can also be achieved via an intermittent laser spark plasma or (a continuous laser arc plasma) that is created by focusing laser power into the gas volume.

A cold plasma can be maintained in a gas by controlling the power deposition so that energy does not transfer from the electrons to the heavy particles because either the pressure is low, the power density is low, or the energy is applied for a short time (pulsed). The resulting plasma generates reactive radicals that flow into and enhance the combustion process, without necessarily depositing energy into ordinary gas heating. A nanosecond plasma can also be configured with gas flow as a plasmatron.

FIG. 5 illustrates an embodiment of a plasma stabilizer 30'. The plasma stabilizer may be a nanosecond plasma stabilizer. The plasma stabilizer 30' may be disposed in the wall of the inlet tube 12 such that the plasma stabilizer body 31 of the plasma stabilizer 30 is external to the inlet tube 12, and fluid and energy are dispersed through the wall of the inlet tube 12 at a plasma stabilizer exit 44. Plasma forms in the vicinity of the plasma stabilizer exit 44 and is pushed into the interior of the inlet tube 12 in region C by fluids within the plasma stabilizer 30. The illustration of FIG. 5 details a plasma stabilizer 30' that may be located within the engine 10 at plasma stabilizer locations, as shown in any of FIGS. 2, 3 and 4.

The plasma stabilizer 30' may include one or more swirlers 42 where air or fuel-air mixtures are introduced at D and swirled together around a dielectric sleeve 40, which forms a cylindrical outer boundary of a high voltage center rod 46. The high voltage center rod 46 is electrically coupled to a voltage source 50 which provides a voltage in a range of up to about 250 volts to the high voltage center rod 46. In one embodiment, the voltage source 50 provides from about 25 volts to about 200 volts to the high voltage center rod 46. In another embodiment, the voltage source 50 provides from about 50 volts to about 150 volts to the high voltage center rod 46. In another embodiment, the voltage source 50 provides from about 75 volts to about 125 volts to the high voltage center rod 46. A mount 32 mechanically couples the plasma stabilizer 30' to the inlet tube 12. The voltage source 50 may be a direct current voltage source or an alternating current voltage source, capable of operating at frequencies up to about 300 GHz, or from about 0.1 GHz to about 300 GHz. The voltage source may also provide an initial or periodic high-voltage in a range from about 250 volts to 20,000 volts, to initiate or maintain the plasma. The voltage source and the geometry of the high voltage center rod 46, annular gap 48, and throat 36 can be coordinated so as to produce high voltages by electrical resonance.

The mount 32 includes a grounding mechanism 34 for electrically grounding the mount 32. In addition, the mount 32 is concentrically disposed around the plasma stabilizer body 31 optionally allowing air and/or fuel-air mixtures to reach the interior of the inlet tube 12. The dielectric sleeve 40 electrically insulates the air and/or fuel-air mixture from the high voltage center rod 46, around which it concentrically flows. The dielectric sleeve 40 may be composed of a ceramic such as alumina or another suitable materials with both electrical insulating and thermal resistance capabilities. The high voltage center rod 46 may be composed of a material capable of conducting electricity, and also resistant to high temperatures. For example, the high voltage center rod 46 may be composed of a metallic material such as Inconel 600, Hastelloy X, tungsten, molybdenum, niobium, nickel, as well as other suitable metals, compounds and alloys thereof. In some cases, the high voltage center rod 46 may be metallic and may be hermetically protected from oxidation in the engine environment. Some embodiments using a direct current voltage source 50 may not include a dielectric sleeve 40. In some embodiments, the high voltage center rod 46 may have air passages (not shown) therethrough for cooling and allowing air to push plasma into the interior of the inlet tube 12 to region C.

Inside the plasma stabilizer body 31, optional air and/or fuel air mixture flows through a converging area 38 and a throat 36 which increases the velocity of the air and/or fuel-air mixture in a radially inward direction. The air and/or fuel air mixture pushes plasma from the vicinity of the plasma stabilizer exit 44 into the interior of the inlet tube 12 to region C. Air, combustion gases and/or fuel-air mixtures flowing in the inlet tube 12 in axial direction A intersects with the plasma at C thereby causing any as-yet unignited gases to ignite. An annular gap 48 between the outer diameter of the dielectric sleeve 40 and/or high voltage center rod 46 and the outer diameter of the plasma stabilizer body 31 defines an annular flow area through which air and/or fuel-air mixtures can flow into the interior of the inlet tube 12. The annular gap 48 may be from about 1 millimeter to about 2 centimeters. In one embodiment, the annular gap 48 is from about 2 millimeters to about 1.5 centimeters. In another embodiment, the annular gap 48 is from about 5 millimeters to about 1.0 centimeter. In another embodiment, the annular gap 48 is from about 6 millimeters to about 9 millimeters. The annular gap 48 concentrically surrounds the dielectric sleeve 40 and/or high voltage center rod 46.

In operation, under ramjet conditions, only the second plurality of fuel injectors 28 may be in operation in addition to the plasma stabilizer(s) 30. Under scramjet conditions, only the first plurality of fuel injectors 14 may be in operation. In conditions close to the transition between ramjet and scramjet conditions, both the first and second pluralities of fuel injectors may be in operation, as well as the plasma stabilizer(s) 30. The plasma stabilizer 30 may include operating modes in which no air or fuel-air mixture is flowing through the plasma stabilizer body 31 and a voltage is still applied to the high voltage center rod 46. In such conditions, plasma energy will travel a shorter distance into the interior of the inlet tube 12 (i.e., closer to the inner wall of the inlet tube 12) because neither air nor fuel-air mixtures will be pushing the plasma toward the center of the inlet tube 12. In addition, the electrical power of the plasma will not be amplified due to ignition of the fuel-air mixture (since there is no fuel-air mixture flowing through the plasma stabilizer body 31 is this operating mode). However, the plasma acts to provide enhanced flame stability within the inlet tube 12, even with no fuel-air mixture flowing through the plasma stabilizer body 31.

Other methods of providing and operationalizing increased autoignition times are also possible, but may be less efficient without plasma. For instance, an array of fuel-injection points could be added, to adapt to different engine conditions, but such an approach may have a slower response than the resonance frequencies provided by the plasma stabilizers 30.

Embodiments herein may improve combustion stabilization and enable dual-mode scramjet engines to operate at lower flight Mach numbers. When combined with a turbine engine, the embodiments described herein enable a combined-cycle engine (see U.S. application Ser. No. 14/663,871 assigned to General Electric Co. of Schenectady, N.Y.) that operates effectively from ground-start to hypersonic speeds.

Exemplary technical effects of the present embodiments include increasing the operating range under which the dual-mode scramjet engine can stably operate. This stable operation can decrease a required operating range in which an associated turbine engine (including rotating turbine and compressor sections) would operate in a combine-cycle engine operation. Stated otherwise, a dual-mode scramjet engine of the present embodiments can operate across a wider operating envelope than previous designs.

Exemplary embodiments of a dual-mode scramjet engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where supersonic combustion is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An engine comprising:
   an air inlet tube for introducing inlet air to a combustion process;
   a plurality of ramjet fuel injectors disposed in the air inlet tube, wherein each ramjet fuel injector of the plurality of ramjet fuel injectors is disposed only at a periphery of the air inlet tube;
   a plurality of scramjet fuel injectors disposed in the air inlet tube and downstream of the plurality of ramjet fuel injectors, wherein each scramjet fuel injector of the plurality of scramjet fuel injectors extends radially inward toward an interior of the air inlet tube, such that each scramjet fuel injector of the plurality of scramjet fuel injectors is configured to inject fuel directly into the inlet air;
   a plurality of plasma stabilizers disposed (i) downstream of the plurality of ramjet fuel injectors and (ii) upstream of the plurality of scramjet fuel injectors; and
   a combustor swirl zone disposed downstream of the plurality of scramjet fuel injectors, the combustion swirl zone comprising a backward facing step portion along each side of the air inlet tube, the backward facing step portion extending to an axial portion, the axial portion extending downstream along each side of the air inlet tube from the backward facing step portion, such that an outer radius of the combustor swirl zone is increased along the axial portion as compared to an outer radius of the air inlet tube, and the axial portion extending to a tapered portion, the tapered portion extending downstream along each side of the air inlet tube from the axial portion, wherein the outer radius of the combustor swirl zone decreases as the tapered portion extends downstream from the axial portion, such that the combustor swirl zone is configured to accommodate swirl only within an area that extends between the backward facing step portion and the tapered portion,
   wherein the tapered portion extends to a downstream portion that extends downstream along each side of the air inlet tube from the combustion swirl zone, the downstream portion extending downstream from the combustion swirl zone at an angle that gradually increases to a diverging exhaust portion,
   wherein the diverging exhaust portion extends downstream along each side of the air inlet tube from the downstream portion and diverges radially outward at a steeper angle than that of the downstream portion.

2. The engine of claim 1, wherein each plasma stabilizer of the plurality of plasma stabilizers further comprises:
a cylindrical dielectric sleeve;
a high voltage center rod within the cylindrical dielectric sleeve; and
a converging flow area, the converging flow area concentrically surrounding the cylindrical dielectric sleeve,
wherein the cylindrical dielectric sleeve electrically isolates the high voltage center rod from the converging flow area.

3. The engine of claim 2 further comprising:
a turbine section; and
a voltage source, the voltage source electrically coupled to the high voltage center rod,
wherein the high voltage center rod is at least partially composed of one of Inconel 600, Hastelloy X, niobium, molybdenum, tungsten and nickel, and
wherein the voltage source provides a voltage to the high voltage center rod.

4. The engine of claim 1, wherein the engine is configured such that (i) under a ramjet condition, only the plurality of ramjet fuel injectors and the plurality of plasma stabilizers are in operation, and (ii) under a scramjet condition, only the plurality of scramjet fuel injectors is in operation.

5. The engine of claim 4, wherein the engine is configured such that, in a transition condition between the ramjet condition and the scramjet condition, at least the plurality of ramjet fuel injectors and the plurality of scramjet fuel injectors are in operation.

6. An engine comprising:
an inlet tube, the inlet tube introducing inlet air to a combustion process;
a first plurality of fuel injectors disposed in the inlet tube and extending radially inward toward an interior of the inlet tube, such that each fuel injector of the first plurality of fuel injectors is configured to inject fuel directly into the inlet air;
a second plurality of fuel injectors disposed upstream from the first plurality of fuel injectors, the second plurality of fuel injectors disposed in the inlet tube, wherein the second plurality of fuel injectors are disposed only at a periphery of the inlet tube, and wherein the second plurality of fuel injectors comprise ramjet fuel injectors;
a plurality of plasma stabilizers disposed (i) downstream of the second plurality of fuel injectors and (ii) upstream of the first plurality of fuel injectors; and
a combustor swirl zone, the combustor swirl zone being disposed downstream of the first plurality of fuel injectors, the combustion swirl zone comprising a backward facing step portion along each side of the inlet tube, the backward facing step portion extending to an axial portion, the axial portion extending downstream along each side of the inlet tube from the backward facing step portion, such that an outer radius of the combustor swirl zone is increased along the axial portion as compared to an outer radius of the inlet tube, and the axial portion extending to a tapered portion, the tapered portion extending downstream along each side of the inlet tube from the axial portion, wherein the outer radius of the combustor swirl zone decreases as the tapered portion extends downstream from the axial portion, such that the combustor swirl zone is configured to accommodate swirl only within an area that extends between the backward facing step portion and the tapered portion;
wherein the tapered portion extends to a downstream portion that extends downstream along each side of the inlet tube from the combustion swirl zone, the downstream portion extending downstream from the combustion swirl zone at an angle that gradually increases to a diverging exhaust portion,
wherein the diverging exhaust portion extends downstream along each side of the air inlet tube from the downstream portion and diverges radially outward at a steeper angle than that of the downstream portion,
wherein each plasma stabilizer of the plurality of plasma stabilizers comprises:
a high voltage center rod; and
a converging flow area, the converging flow area concentrically surrounding the high voltage center rod, the converging flow area including an outer diameter,
wherein an annular gap is defined between the high voltage center rod and the outer diameter of the converging flow area.

7. The engine of claim 6 further comprising:
a turbine section,
wherein the annular gap is from about 1 millimeter to about 2 centimeter.

8. The engine of claim 6, wherein the engine is configured such that (i) under a ramjet condition, only the second plurality of fuel injectors and the plurality of plasma stabilizers are in operation, and (ii) under a scramjet condition, only the first plurality of fuel injectors is in operation.

9. The engine of claim 8, wherein the engine is configured such that, in a transition condition between the ramjet condition and the scramjet condition, at least the second plurality of fuel injectors and the first plurality of fuel injectors are in operation.

\* \* \* \* \*

UNITED STATES PATENT AND TRADEMARK OFFICE
CERTIFICATE OF CORRECTION

PATENT NO. : 11,415,080 B2
APPLICATION NO. : 15/979217
DATED : August 16, 2022
INVENTOR(S) : Nicholas William Rathay et al.

It is certified that error appears in the above-identified patent and that said Letters Patent is hereby corrected as shown below:

In the Claims

Claim 6, Column 10, Lines 23-24, "wherein the diverging exhaust portion extends downstream along each side of the air inlet tube from the" should be -- wherein the diverging exhaust portion extends downstream along each side of the inlet tube from the --

Signed and Sealed this
Fourth Day of October, 2022

Katherine Kelly Vidal
*Director of the United States Patent and Trademark Office*